United States Patent [19]

Bobbe

[11] 4,090,786

[45] May 23, 1978

[54] MULTI-COLOR SCREEN FOR ELECTROPHOTOGRAPHIC PRINTING

[75] Inventor: Richard M. Bobbe, Rochester, N.Y.

[73] Assignee: Xerox Corporation, Stamford, Conn.

[21] Appl. No.: 688,649

[22] Filed: May 21, 1976

[51] Int. Cl.² ....................... G03G 15/01; G03B 27/76

[52] U.S. Cl. ....................................... 355/4; 355/3 R; 355/71

[58] Field of Search .......................... 355/3 R, 4, 8, 71

[56] References Cited

U.S. PATENT DOCUMENTS

| | | | |
|---|---|---|---|
| 3,748,035 | 7/1973 | Mannik | 355/4 |
| 3,961,847 | 6/1976 | Turner et al. | 355/4 |
| 4,012,137 | 3/1977 | Goren | 355/4 |

*Primary Examiner*—Fred L. Braun

*Attorney, Agent, or Firm*—J. J. Ralabate; C. A. Green; H. Fleischer

[57] ABSTRACT

An electrophotographic printing machine in which a screen interposed in the path of the light image modulates the light image irradiating the charged portion of a photoconductive member. The screen comprises a plurality of sets of light filtering regions. Each set of light filtering regions is substantially complementary in color to the color of the filtered light image, and rotated through a pre-selected angle relative to the next adjacent set of light filtering regions.

12 Claims, 4 Drawing Figures

MULTI-COLOR SCREEN FOR ELECTROPHOTOGRAPHIC PRINTING

BACKGROUND OF THE INVENTION

This invention relates generally to electrophotographic printing, and more particularly concerns an optical system employing a half-tone screen which minimizes moire patterns.

Conventional screening methods employed in electrophotographic printing machines produce the effect of tone gradation by means of dot size variations. In the highlight regions, the dots are small and increase in size through the intermediate shades until they merge together in the shadow regions. At the highlight end of the tone scale, there is complete whiteness, while, at the shadow end, there is nearly solid blackness. This type of pattern can be reproduced in an electrophotographic printing machine through the use of dot screens.

Many techniques have been developed to improve half-tone reproductions. In graphic arts, moire patterns are minimized by changing the screen orientation between successive single color half-tone patterns. With the advent of colored electrophotographic printing, screening techniques have been employed to improve copy quality. Multi-colored electrophotographic printing is similar to black and white printing. The process of black and white electrophotographic printing is described in U.S. Pat. No. 2,297,691 issued to Carlson in 1942. In multi-color electrophotographic printing, the light image is filtered producing successive single color light images of the original document. These colored light images expose a charged photoconductive surface to create successive single color electrostatic latent images thereon. Each single color electrostatic latent image is developed with toner particles complementary in color to the color of the filtered light image. The toner powder images are transferred from the electrostatic latent image to a sheet of support material, in superimposed registration with one another. In this manner, a multi-layered toner powder image is formed on the sheet of support material. This multi-layered toner powder image is then permanently affixed to the sheet of support material forming a color copy. Half-tone screens are employed in multi-color electrophotographic printing to enhance the copy being reproduced thereby. Generally, the screen is interposed into the optical light path and successive single color light images are transmitted therethrough onto the charged photoconductive surface forming an image comprising a plurality of dots. As described in co-pending application Ser. No. 541,748 filed in 1975, now U.S. Pat. No. 4,012,137 the screen may be rotated through successive angles between each single color light image. Thus, for the first single color light image, the screen is at a 15° angle relative to the horizontal. For the second light image, the screen is at a 45° angle relative to the horizontal, and for the final light image, the screen is at a 75° angle relative to the horizontal. However, in a system of this type, the screen must be rotated between successive single color light images in order to minimize the formation of moire patterns which severely degradate copy quality.

U.S. Pat. No. Re. 26,058 issued to Archer in 1966, discloses a half-tone screen comprising a plurality of differently colored dots thereon. The dot patterns are rotated relative to one another by 30°. Thus, one set of dots is positioned at 15° relative to the bottom edge of the screen base, the second set of dots being positioned at 45° relative to the base edge of the base, and the third set of dots being positioned at 75° relative to the bottom edge of the base. As described therein, the screen is employed in color photography for making direct, color-separation, half-tone negatives.

Accordingly, it is a primary object of the present invention to improve multi-color electrophotographic printing by employing a stationary screen in the optical system to obtain pictorial quality copies therefrom.

SUMMARY OF THE INVENTION

Briefly stated, and in accordance with the present invention, there is provided an electrophotographic printing machine for reproducing an original document.

Pursuant to the features of the present invention, the electrophotographic printing machine includes a photoconductive member and means for charging at least a portion thereof to a substantially uniform level. Means are provided for projecting successive color filtered light images of the original document onto the charged portion of the photoconductive member. A screen member is interposed into the path of the light image. In this manner, the screen member modulates the light image irradiating the charged portion of the photoconductive member to a record a modulated single color electrostatic latent image thereon. The screen member comprises a plurality of sets of light filtering regions, each set being substantially complementary in color to the color of one of the filtered light images. Each set of light filtering regions is rotated through a pre-selected angle relative to the next adjacent set of light filtering regions.

BRIEF DESCRIPTION OF THE DRAWINGS

Other objects and advantages of the present invention will become apparent upon reading the following detailed description and upon reference to the drawings, in which.

While the present invention will be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
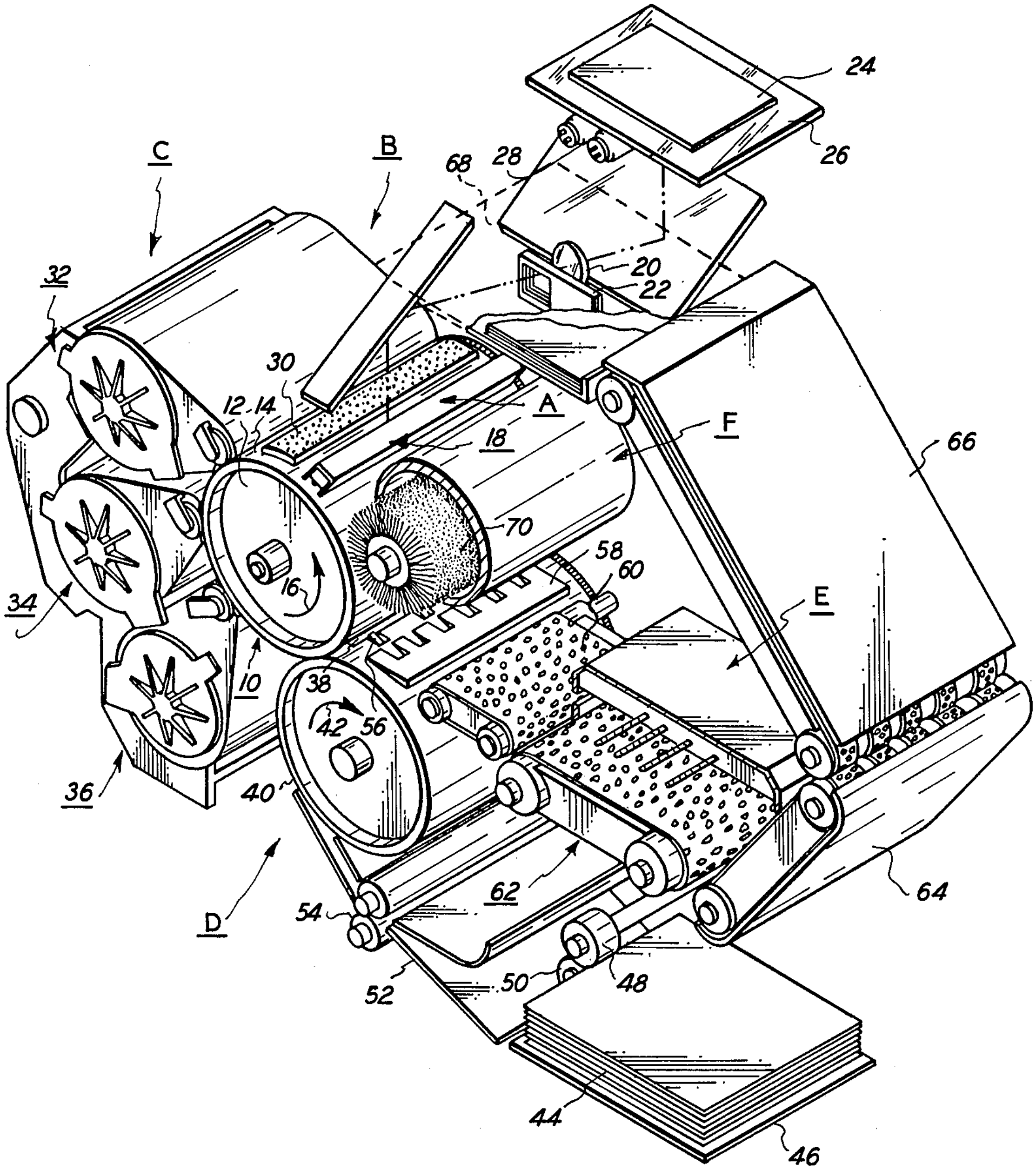
FIG. 1 is a schematic perspective view of an electrophotographic printing machine incorporating the features of the present invention therein.

For a general understanding of an electrophotographic printing machine incorporating the features of the present invention therein, reference is had to FIG. 1. Throughout the drawings, like reference numerals have been used to designate identical elements. FIG. 1 depicts a multi-color electrophotographic printing machine producing colored copies from a colored original document which may be in the form of single sheets, books or other three dimensional objects. The present invention is directed to an optical system which is capable of creating successive half-tone light images of variable contrast. Although this optical system is particularly well adapted for use in multi-color electrophotographic printing machine, it will become evident from the following description that it is equally well suited for use in a wide variety of printing machines and is not necessarily limited to the particular embodiment shown herein.

For purposes of the present application, each processing station operating in the electrophotographic printing machine will be described briefly hereinafter.

As shown in FIG. 1, the electrophotographic printing machine includes a photoconductive member comprising a rotatable drum, designated generally by the reference numeral 10. Drum 10 includes a conductive substrate 12 having a photoconductive surface 14 entrained thereabout and secured thereto. Preferably, photoconductive surface 14 is made from a polychromatic selenium alloy of a type described in U.S. Pat. No. 3,655,377 issued to Sechak in 1972. Conductive substrate 12 is preferably made from a suitable aluminum alloy. As shown in FIG. 1, drum 10 rotates in the direction of arrow 16. A signal generator (not shown) rotates in unison with drum 10 to activate sequentially the various processing stations at the appropriate time during the reproduction cycle.

As drum 10 rotates in the direction of arrow 16, successive portions of photoconductive surface 14 pass through charging station A. Charging station A has positioned thereat a corona generating device, indicated generally by the reference numeral 18, which charges portions of photoconductive surface 12 to a relatively high substantially uniform level. A suitable corona generating device is described in U.S. Pat. No. 3,875,407, issued to Hayne in 1975. After photoconductive surface 14 is charged to a substantially uniform level, drum 10 rotates the charged portion thereof to exposure station B.

At exposure station B, the charged area of photoconductive surface 14 is exposed to a color filtered light image of the original document. Lens 20 and filter mechanism 22 are located at exposure station B and move in synchronism with the rotation of drum 10. A suitable drive system is described in U.S. Pat. No. 3,062,108 issued to Mayo in 1952. U.S. Pat. No. 3,775,006 issued to Hartman et al. in 1973 discloses a color filter mechanism suitable for use in the FIG. 1 electrophotographic printing machine. Preferably, lens 20 is a six-element split dagor type of lens assembly having three elements in the front component and three elements in the back component with a diaphragm interposed therebetween. U.S. Pat. No. 3,592,531 issued to McCrobie in 1971 describes a lens of this type. Original document 24 is positioned upon transparent viewing platen 26 face down. Lamp assembly 28, located beneath transparent viewing platen 26, illuminates the original document. In this manner, a flowing light image of original document 24 is created and projected through screen member 30 onto the charged portion of photoconductive surface 14. The irradiation of the charged portion of photoconductive surface 14 results in the selective discharge thereof and the recording of an electrostatic latent image corresponding to a single color of the informational areas contained in original document 24. During exposure, filter mechanism 22 interposes selected color filters into the optical light path. Successive color filters operate on the light rays passing through lens 20 to create a single color light image which is modulated by screen 30. Screen member 30 includes a plurality of differently colored light filtering regions, i.e., dots. Thus, there are magenta, cyan, and yellow dots thereon. In this way, the dots absorb only one color, i.e., that of one of the filtered light images. For example, when a green filtered light image is projected through screen 30, the magenta dots act as opaque regions, whereas the cyan and yellow dots act as substantially transparent regions. Thus, the magenta dots modulate the green light image. Similarly, the cyan dots modulate the red light image and the yellow dots modulate the blue light image. Each set of differently colored dots is rotated relative to the next adjacent set of differently colored dots by about 30°. In this way, moire' patterns are minimized. The characteristics of the optical system employed in exposure station B will be described hereinafter, in greater detail, with reference to FIGS. 2 through 4, inclusive.

After the modulated single color electrostatic latent image is recorded on photoconductive surface 14, drum 10 rotates the latent image to development station C. Development station C includes three developer units generally designated by the reference numerals 32, 34 and 36, respectively. A suitable development station employing plurality of developer units (in this case three) is described in U.S. Pat. No. 3,854,449 issued to Davidson in 1974. Each of the foregoing developer units is of a magnetic brush type. A typical magnetic brush developer unit employs a developer mix comprising magnetic carrier granules and toner particles. The developer units generate a directional flux field to form a brush of developer mix. This brush is brought into contact with the latent image recorded on photoconductive surface 14. The toner particles adhering electrostatically to the carrier granules of the developer mix are attracted by the greater electrostatic force of the latent image thereto. Developer units 32, 34 and 36, respectively, contain differently colored toner particles. Each of the toner particles contained in the corresponding developer unit relates to the complement of the color of the light image transmitted through filter 22. Hence, a latent image formed from a green filtered light image is developed with green absorbing magenta particles. Similarly, a latent image formed from blue and red light images are developed with yellow and cyan toner particles, respectively.

After the latent image recorded on photoconductive surface 14 is developed, drum 10 rotates the toner powder image to transfer station D. At transfer station D, the toner powder image adhering electrostatically to photoconductive surface 14 is transferred to a sheet of support material 38 secured releasably on transfer roll 40. Transfer roll 40 rotates in the direction of arrow 42 to recirculate sheet 38 in synchronism with the angular rotation of drum 10, as indicated by arrow 16. A suitable electrically biased transfer roll having a sheet of support material secured thereto is described in U.S. Pat. No. 3,612,677 issued to Langdon et al. in 1971. As described therein, transfer roll 40 is electrically biased to a potential of sufficient magnitude and polarity to electrostatically attract toner particles from photoconductive surface 14 to sheet 38. Inasmuch as transfer roll 40 rotates in synchronism with drum 10, successive toner powder images may be transferred from photoconductive surface 14 to sheet 38, in superimposed registration with one another.

Prior to proceeding with the remaining processing stations disposed about the periphery of drum 10, the sheet feeding apparatus will be briefly described. With continued reference to FIG. 1, sheet 38 is advanced from stack 44 disposed upon tray 46. Feed roll 48, in operative communication with retard roll 50, separates and advances the uppermost sheet from stack 44. The sheet advances into chute 52, which, in turn, directs it into the nip between register rolls 54. Register rolls 54 align and forward the advancing sheet, in synchronism with the movement of transfer roll 40. In this way, gripper fingers 56, disposed on transfer roll 40, receive sheet 38 and secure it thereto. Gripper fingers 56 secure releasably support material 38 on transfer roll 40 for movement in a recirculating path therewith. Successive toner powder images are transferred to support material 38 in superimposed registration with one another forming a multi-layered toner powder image thereon. After transferring each of the toner powder images (in this case three) to support material 38, gripper fingers 56 space support material 38 from transfer roll 40. Stripper bar 58 is then interposed therebetween to separate support material 38 from transfer roll 40. Thereafter, endless belt conveyor 60 moves support material 38 to fixing station E.

Fixing station E includes a fusing apparatus, indicated generally by the reference numeral 62. Fuser 62 provides sufficient heat to permanently affix the multi-layered toner powder image to sheet 38. One type of suitable fuser is described in U.S. Pat. No. 3,826,898 issued to Draugelis et al. in 1974. After the fusing process, sheet 38 is advanced by endless belt conveyors 64 and 66 to catch tray 68 for subsequent removal therefrom by the printing machine operator.

Invariably, after transferring the requisite number of toner powder image to support material 38, some residual toner particles remain adhering to photoconductive surface 14. Cleaning station F, the final processing station in the direction of rotation of drum 10, as indicated by arrow 16, removes these residual toner particles. A pre-clean corona generating device (not shown) neutralizes the charge on photoconductive surface 14 and that of the residual toner particles. This enables fibrous brush 70, in contact with pohotoconductive surface 14, to remove the residual toner particles therefrom. A suitable brush cleaning device is described in U.S. Pat. No. 3,590,413 issued to Gerbasi in 1971.

It is believed that the foregoing description is sufficient for purposes of the present application to describe a multi-colored electrophotographic printing machine incorporating the features of the present invention therein.

Figure 2:
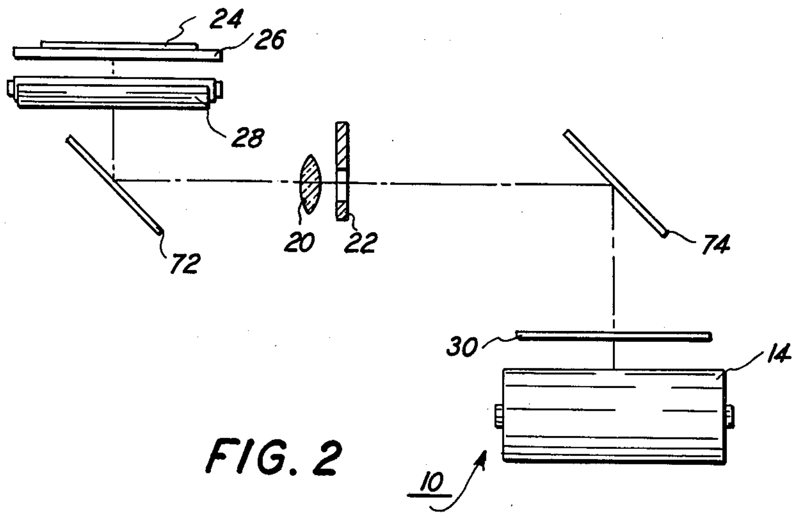
FIG. 2 is an elevational view of the optical system employed in the FIG. 1 printing machine.

Referring now to FIG. 2, exposure station B will be described hereinafter in greater detail. As shown therein, lamps 28 move across platen 26 illuminating original document 24 disposed face down thereon. Lens 20 and filter 22 move in synchronism therewith. The light rays reflected from original document 24 are transmitted through platen 26 onto mirror 72. Mirror 72 reflects the light rays through lens 20 and filter 22 onto mirror 74. Mirror 74 reflects the light image through screen 30 onto the charged portion of photoconductive surface 12.

As previously noted, lens 20 is a six element split dagor type of lens having front and back compound lens components with a centrally located diaphragm therebetween. Lens 20 forms a high quality image with a field angle of about 31° and a speed ranging from about F/4.5 to about F/8.5 at a 1:1 magnification. In addition, lens 20 is designed to minimize the effect of secondary color in the image plane. The front lens component has three lens elements, including, in the following order; a first lens element of positive power, a second lens element of negative power cemented to the first lens element, and a third lens element of positive power disposed between the second lens element and the diaphragm. The back lens component also has three similar lens elements positioned so that lens 20 is symmetrical. Specifically, the first lens element in the front component is a double convex lens, the second element a double concave lens, and the third element a convex-concave lens element. For greater details regarding lens 20, reference is once again made to U.S. Pat. No. 3,592,531 issued to McCrobie in 1971.

One embodiment of filter mechanism 22 is illustrated in FIG. 2. As shown therein, filter mechanism 22 includes a housing which is mounted on lens 20 by a suitable bracket and moves with lens 20 during scanning as a single unit. The housing of filter 22 includes a window which is positioned relative to lens 20 permitting the light rays of the light image to pass therethrough. Bottom and top walls of the housing include a plurality of tracks which extend the entire width thereof. Each track is adapted to carry a filter to permit movement thereof from an inoperative position to an operative position. In the operative position, the filter is interposed into the window of the housing permitting light rays to pass therethrough. Individual filters are made from any suitable filter material such as coated glass. Preferably, three filters are employed in the electrophotographic printing machine depicted in FIG. 1, a red filter, a blue filter, and a green filter. As noted hereinbefore, a detailed description of the filter mechanism is found in U.S. Pat. No. 3,775,006 issued to Hartman et al. in 1973. An alternative embodiment of filter mechanism 22 will be described hereinafter with reference to FIG. 4. The light image transmitted through screen 30 is modulated, thereby recording a modulated single color electrostatic latent image on photoconductive surface 14.

Figure 3:
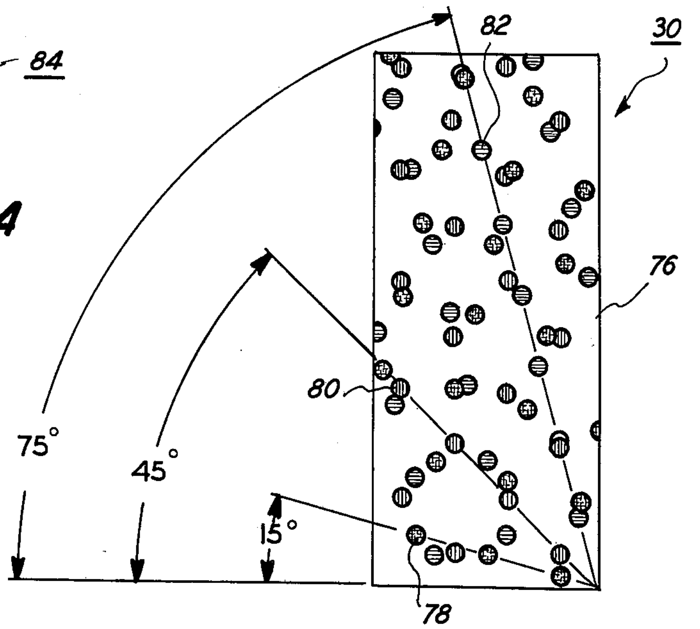
FIG. 3 is an elevational view of the screen employed in the FIG. 2 optical system.

Turning now to FIG. 3, there is shown the details of screen member 30. Screen member 30 comprises a transparent sheet 76 having a plurality of hard dots thereon. The dots cover approximately thirty percent of the area with the remaining area being substantially transparent. A plurality of sets of dots are disposed on transparent sheet 76. Each set of dots acts as a light filter permitting light rays having a discrete spectral bandwidth to pass therethrough. Thus, the set of yellow dots 78 is oriented at about 15° relative to the horizontal of transparent sheet 76. The set of magenta dots 80 is rotated 30° from the set of yellow dots 78. Hence, magenta dots 80 are oriented at 45° relative to the horizontal of transparent sheet 76. Finally, cyan dots 82 are oriented at 75° relative to the horizontal of transparent sheet 76. Therefore, cyan dots 82 are rotated 30° relative to magenta dots 80. In operation, magenta dots 80 act as opaque regions when a green filtered light image is transmitted therethrough. Thus, the green filtered light image is modulated by the magenta dots. Contrawise, the red and blue light images are transmitted through magenta dots 80 and remain unmodulated thereby. Yellow dots 78 absorb the blue light image and act as opaque regions therefor while transmitting the yellow and red light images therethrough. Thus, yellow dots 78 will modulate the blue light image. Finally, cyan dots 82 absorb the red light image and act to modulate it, while transmitting the blue and green light images therethrough. It is , therefore, evident that the screening patterns are automatically rotated relative to one another by 30°. For example, the yellow dots modulate the blue light image at an angle of 15°. The magenta dots modulate the green light image at an angle of 45°. In this way, the modulation between the blue light image and green light image is rotated 30°. Finally, the cyan dots modulate the red light image at 75°. Hence, the cyan dots modulate the red light image at an angle rotated 30° from the angle of the magenta dots. In this manner, the modulation pattern between each successive light image is rotated 30° automatically via the utilization of filters and a multi-color screen having the dot patterns thereon rotated relative to one another by 30°. As previously noted, U.S. Pat. No. Re. 26,058 issued to Archer in 1966 describes a multi-color half-tone screen for color separation in a photographic process.

Figure 4:
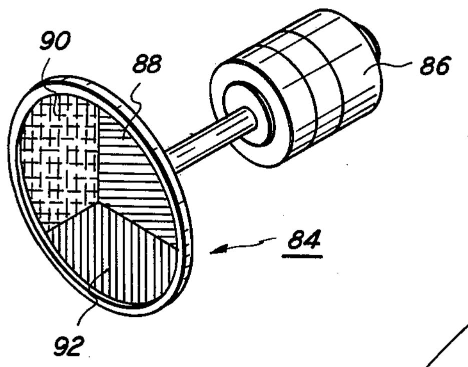
FIG. 4 is a schematic perspective view of an alternate embodiment of the filter mechanism employed in the FIG. 2 optical system.

Referring now to FIG. 4, there is shown an alternate embodiment of filter mechanism 22. As illustrated therein, disc 84 is mounted on the shaft of a stepping motor 86. Disc 84 is divided into three sectors, each sector being about 120°. Sector 88 is red, sector 90 blue, and sector 92 green. Preferably, each sector acts as an interference type of filter. In operation, stepping motor 86 is activated to sequentially interpose one sector at a time into the optical light path during each image separation. Thus, sector 88 would be interposed into the optical light path to form a red light image. Next sector 90 is interposed into the optical light path to form a blue light image. Finally, sector 92 is interposed into the optical light path to form the green light image. The machine logic controls the activation of stepping motor 86 so as to rotate the corresponding sectors sequentially into the optical light path at the prescribed time during the machine cycle. This type of filter arrangement would also operate as hereinbefore described, in conjunction with screen member 30 to rotate the dot patterns of the single color light images relative to one another by 30°.

In recapitulation, the multi-color electrophotographic printing machine of the present invention employs a multi-color screen having a plurality of light filtering regions rotated relative to one another by 30+. Each light filtering region comprises dots which filter one of the light images being formed by the optical system of the printing machine. In this manner, the dot patterns of successive single color light images are rotated relative to one another by 30° without rotating the screen between successive light images. This approach minimizes the effect of moire patterns in the resultant copy.

Thus, it is apparent that there has been provided, in accordance with the present invention, an electrophotographic printing machine that fully satisfies the objects, aims and advantages hereinbefore set forth. While this invention has been discussed in conjunction with a specific embodiment thereof, it is evident that many alternatives, modifications and variations will be apparent to those skilled in the art in light of the foregoing description. Accordingly, it is intended to embrace all such alternatives, modifications and variations that fall within the spirit and broad scope of the appended claims.

What is claimed is:

1. An electrophotographic printing machine for reproducing an original document, including:

a photoconductive member;

means for charging at least a portion of said photoconductive member to a substantially uniform level;

means for projecting successive color filtered light images of the original document onto the charged portion of said photoconductive member; and a substantially stationary screen member positioned in the path of the light image to modulate the light image irradiating the charged portion of said photoconductive member recording a modulated single color electrostatic latent image thereon, said screen member comprising a plurality of light filtering regions, each of the light filtering regions having a multiplicity of colored areas with the colors of each of the light filtering regions being different from one another and being substantially complementary in color to the color of one of the filtered light images with each of the light filtering regions being rotated a pre-selected angle relative to the next adjacent one of the light filtering regions.

2. A printing machine as recited in claim 1, wherein each of the light filtering regions of said screen member is rotated about 30° relative to the next adjacent one of the light filtering regions.

3. A printing machine as recited in claim 2, wherein said screen member includes:

a magenta light filtering region;

a cyan light filtering region; and a yellow light filtering region.

4. A printing machine as recited in claim 3, wherein:

said magenta light filtering region is located at about 45° relative to the horizontal;

said yellow light filtering region is located at about 15° relative to the horizontal; and said cyan light filtering region is located at about 75° relative to the horizontal.

5. A printing machine as recited in claim 4, wherein the colored areas of said light filtering regions include a plurality of dots.

6. A printing machine as recited in claim 5, wherein said screen member includes a substantially transparent sheet having said dots disposed thereon.

7. A printing machine as recited in claim 6, wherein said dots include hard dots.

8. A printing machine as recited in claim 7, wherein said dots have an area covering about thirty percent of the area of said transparent sheet.

9. A printing machine as recited in claim 1, wherein said projecting means includes:

means for illuminating the original document;

a lens for creating a light image of the original document from the light rays transmitted thereto; and means for filtering the light image to form successive differently colored light images.

10. A printing machine as recited in claim 9, wherein said filtering means includes:

a red filter;

a blue filter; and a green filter.

11. A printing machine as recited in claim 10, wherein said filtering means includes:

a disc having a red sector, a blue sector, and a green sector; and means for rotating said disc to interpose successive sectors thereof into the path of the light image.

12. A printing machine as recited in claim 1, further including:

means for developing the single color electrostatic latent images with toner particles complementary in color to the color of the filtered light images;

means for transferring the toner particles from the electrostatic latent images to a sheet of support material in superimposed registration with one another; and means for affixing substantially permanently the toner particles to the sheet of support material.

* * * * *